United States Patent
Schlueter, Jr. et al.

(10) Patent No.: US 6,514,650 B1
(45) Date of Patent: Feb. 4, 2003

(54) THIN PERFLUOROPOLYMER COMPONENT COATINGS

(75) Inventors: Edward L. Schlueter, Jr., Rochester, NY (US); Arnold W. Henry, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/389,115

(22) Filed: Sep. 2, 1999

(51) Int. Cl.$^7$ .......................... G03G 15/00; B32B 1/08; B32B 25/14; B32B 25/20; B32B 5/00
(52) U.S. Cl. ........................ 430/56; 399/159; 399/308; 399/320; 399/328; 428/36.8; 428/36.91; 428/319.3; 428/335; 428/336; 428/421; 428/422; 428/447; 428/448; 428/521; 428/906; 492/56
(58) Field of Search ................................ 428/421, 422, 428/35.2, 35.9, 365, 368, 38.91, 319.3, 319.7, 319.9, 335, 336, 447, 448, 521, 906; 492/56; 399/308, 159, 320, 328; 430/56, 60, 66

(56) References Cited

U.S. PATENT DOCUMENTS

| | | | | |
|---|---|---|---|---|
| 3,132,123 A | | 5/1964 | Harris, Jr. et al. | 260/87.5 |
| 3,467,638 A | * | 9/1969 | Pattison | 526/247 |
| 3,682,827 A | | 8/1972 | Ichinose et al. | 252/62.9 |
| 4,199,626 A | * | 4/1980 | Stryjewski et al. | 427/444 |
| 4,234,197 A | | 11/1980 | Amancharla et al. | 277/124 |
| 4,281,092 A | | 7/1981 | Breazeale | 526/247 |
| 4,610,918 A | | 9/1986 | Effenberger et al. | 428/245 |
| 4,654,235 A | | 3/1987 | Effenberger et al. | 427/407.3 |
| 4,770,927 A | | 9/1988 | Effenberger et al. | 428/245 |
| 4,826,731 A | | 5/1989 | Wagner et al. | 428/422 |
| 4,894,686 A | | 1/1990 | Bujese | 355/271 |
| 4,983,680 A | | 1/1991 | Ojakaar | 525/281 |
| 5,089,200 A | | 2/1992 | Chapman, Jr. et al. | 264/127 |
| 5,194,335 A | | 3/1993 | Effenberger et al. | 428/421 |
| 5,230,937 A | | 7/1993 | Effenberger et al. | 428/113 |
| 5,252,401 A | | 10/1993 | Kitto et al. | 428/422 |
| 5,391,072 A | | 2/1995 | Lawton et al. | 425/174.4 |
| 5,502,476 A | | 3/1996 | Neal et al. | 347/103 |
| 5,527,861 A | | 6/1996 | Logothetis | 525/370 |
| 5,529,473 A | | 6/1996 | Lawton et al. | 425/174.4 |
| 5,572,275 A | | 11/1996 | Jinzai | 399/331 |
| 5,614,933 A | | 3/1997 | Hindman et al. | 347/103 |
| 5,688,600 A | | 11/1997 | Bailey, Jr. | 428/421 |
| 5,759,329 A | | 6/1998 | Krause et al. | 156/244.13 |
| 5,777,650 A | | 7/1998 | Blank | 347/103 |
| 5,965,314 A | * | 10/1999 | Herman et al. | 430/126 |
| 6,103,815 A | * | 8/2000 | Mammino et al. | 524/546 |
| 6,134,395 A | * | 10/2000 | Sasaki et al. | 399/46 |

OTHER PUBLICATIONS

DuPont Dow Elastomers website http://www.dupont-dow.com/products/kalrez/default.html–document entitled "Kalrez Page", 1 page, printed Jul. 9, 1999.

DuPont Dow Elastomers website http://www.dupont-dow.com/products/kalrez/properties/comparative.hmtl—document entitled "Critical Properties", 1 page, printed Jul. 9, 1999.

DuPont Dow Elastomers website http://www.dupont-dow.com/products/kalrez/properties/default.html—document entitled "Critical Properties", 1 page, printd Jul. 9, 1999.

DuPont Dow Elastomers website http://www.dupont-dow.com/products/kalrez/parts/default.html—document entitled "Our Parts Offerings", 1 page, printed Jul. 9, 1999.

DuPont Dow Elastomers website http://www.dupont-dow.com/products/kalrez/stories/resistance.html—document entitled "Success Stories", 3 pages, printed Jul. 9, 1999.

* cited by examiner

*Primary Examiner*—Stevan A. Resan
*Assistant Examiner*—Ramsey Zacharia
(74) *Attorney, Agent, or Firm*—Annette L. Bade

(57) ABSTRACT

An electrostatographic component having a substrate and an outer coating of a thin, conformable perfluoroelastomer, wherein the outer coating has a thickness of from about 1 to about 75 micrometers, and wherein the unit manufacturing cost of developing the component is decreased and adhesion of the layer is increased.

20 Claims, 2 Drawing Sheets

THIN PERFLUOROPOLYMER COMPONENT COATINGS

BACKGROUND OF THE INVENTION

The present invention is directed to composites useful in electrostatographic, including electrophotographic, image on image, contact electrostatic printing, digital and the like processes. The invention further relates to thin composite coatings, wherein the coating is a perfluoropolymer, and in embodiments, a perfluoroelastomer. The composites can be used in a variety of applications in the electrostatographic or electrophotographic fields.

In a typical electrostatographic reproducing apparatus such as electrophotographic imaging system utilizing a photoreceptor, a light image of an original to be copied is recorded in the form of an electrostatic latent image upon a photosensitive member and the latent image is subsequently rendered visible by the application of electroscopic thermoplastic resin particles which are commonly referred to as toner. Generally, the electrostatic latent image is developed by bringing a developer mixture into contact therewith. Toner particles are attracted from the carrier granules to the latent image forming a toner powder image thereon. Alternatively, a liquid developer material may be employed. After the toner particles have been deposited on the photoconductive surface, in image configuration, the developed image is transferred to a receiving copy substrate. The image is subsequently fused to a copy substrate by the application of heat in combination with pressure.

Many of the components useful in the electrostatographic and electrophotographic processes require low surface energy materials for releasing both powder and liquid toner. Other requirements for coatings for many of the components are that the material coatings have superior release, wear and temperature resistance. Known component coatings include rigid fluoropolymers such as tetrafluoroethylene, perfluoroalkoxy, and polytetrafluoroethylene polymers. These rigid fluoropolymer materials demonstrate adequate release and wear properties, and are temperature resistant. However, these fluoro-materials are not adequate when high copy quality is required or when smooth copy substrates are used. The release properties tend to decrease with time and heavy use of the component. Further, adhesion problems have occurred with the rigid fluoropolymer coatings causing the coating to delaminate or pull apart from the component.

A more conformable coating possesses improved release characteristics over the rigid fluoropolymer materials. Many conformable coatings such as silicone and fluoroelastomers such as VITON® (a fluoro-tetrapolymer from DuPont) provide good electrical, thermal and mechanical properties. Further, conformable materials such as VITON® have a higher surface energy (for example, from about 34 to about 37 dynes/cm) than that of silicone (for example, from about 21 to about 25 dynes/cm). The higher surface energy can result in inferior toner release. Lower surface energy conformable coatings such as silicone materials may have better release properties, but tend to swell in the presence of oils, such as fusing oils or release agents, and especially hydrocarbon fluids.

Conformable fluoroelastomer materials such as conformable perfluoroelastomers have been developed and used as outer coatings in some electrostatic components such as fuser rollers and transfer rollers. These materials have the superior release properties, as well as superior mechanical, electrical and thermal properties. In addition, conformable perfluoroelastomers do not tend to swell in the presence of oils.

U.S. Pat. No. 4,610,918 teaches a composite having a perfluoropolymer initial layer thereon.

U.S. Pat. No. 4,654,235 discloses a composite having a perfluoroelastomer layer and outer layer positioned on the perfluoroelastomer layer.

U.S. Pat. No. 4,770,927 discloses a composite having a perfluoroelastomer layer and outer layer positioned on the perfluoroelastomer layer.

U.S. Pat. No. 4,894,686 discloses a transfer roller which may be coated with a perfluoroelastomer.

U.S. Pat. No. 5,230,937 discloses a composite having a perfluoroelastomer layer and outer layer positioned on the perfluoroelastomer layer.

U.S. Pat. Nos. 5,614,933 and 5,502,476 teach an ink jet heated drum having a perfluoroelastomer layer thereon.

U.S. Pat. No. 5,572,275 discloses a fixing device having a mixture layer prepared by mixing a perfluoroelastomer having rubber elasticity and a fluorine resin.

U.S. Pat. No. 5,759,329 teaches a tube or pipe having an inner layer of a perfluoroalkoxy ethylene polymer.

U.S. Pat. No. 5,777,650 discloses an ink jet printer having a transfer roller, wherein the transfer roller may have a perfluoroelastomer layer thereon.

However, conformable fluoroelastomers can be very expensive. For example, KALREZ® (available from DuPont) costs approximately $1,000.00 per pound. In addition, conformable perfluoroelastomers have had problems with adhesion, and have exhibited delamination of the outer layer from the component substrate.

It is desired to develop a conformable coating with superior electrical properties, temperature stability, and improved release properties, which does not swell in the presence of oils. In addition, it is desired to develop a conformable coating which has superior adhesion properties and which has a decreased tendency to delaminate. Moreover, it is desired that the conformable coating be cost effective.

SUMMARY OF THE INVENTION

Embodiments of the present invention include: an electrostatographic component comprising a substrate and an outer coating of a thin, conformable perfluoroelastomer, wherein the outer coating has a thickness of from about 1 to about 75 micrometers.

Embodiments further include: an image forming apparatus for forming images on a recording medium comprising a processing station, wherein the processing station comprises a xerographic system member comprising a substrate and an outer coating of a thin, conformable perfluoroelastomer, wherein the outer coating has a thickness of from about 1 to about 75 micrometers.

In addition, embodiments include: an image forming apparatus for forming images on a recording medium comprising a processing station, wherein the processing station comprises a xerographic system member comprising a substrate and an outer coating of a thin, conformable perfluoroelastomer, wherein the outer coating has a thickness of from about 1 to about 75 micrometers, and wherein the perfluoroelastomer is the reaction product of perfluoro (3-phenoxypropylvinyl ether) and at least one fluorine-containing ethylenically unsaturated monomer.

BRIEF DESCRIPTION OF THE DRAWINGS

For a better understanding of the present invention, reference may be had to the accompanying figures.

DETAILED DESCRIPTION OF THE PRESENT INVENTION

Figure 1:
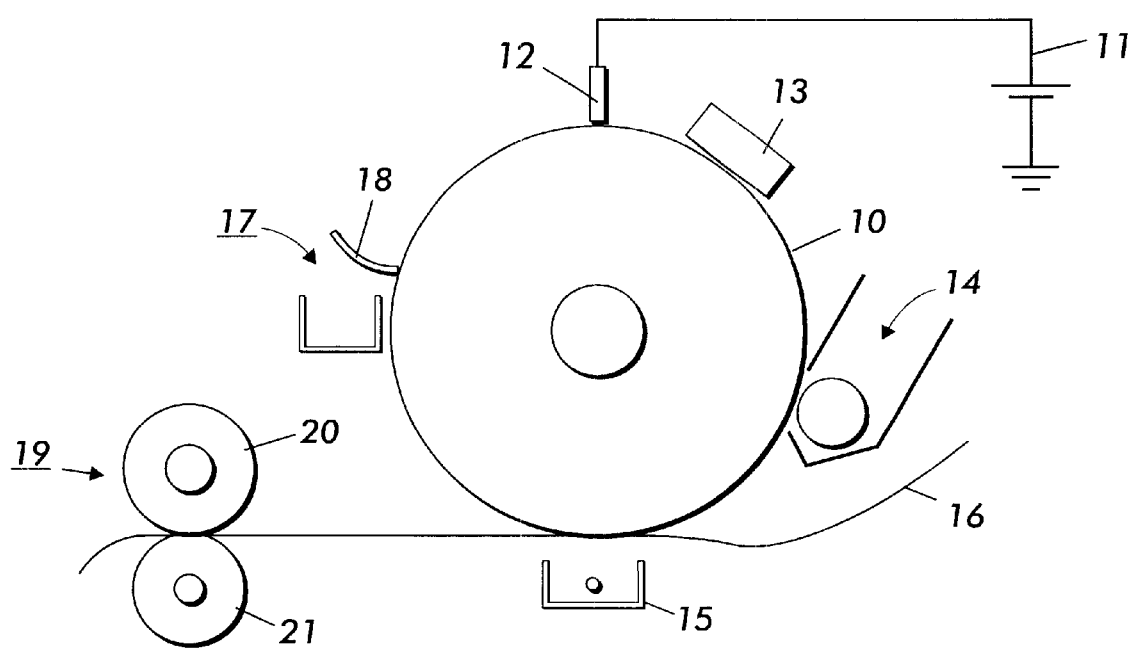
FIG. 1 is a schematic view of an embodiment of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fuser roll 20 and pressure roll 21, wherein the developed image is fused to copy sheet 16 by passing copy sheet 16 between the fusing and pressure members, thereby forming a permanent image. Photoreceptor 10, subsequent to transfer, advances to cleaning station 17, wherein any toner left on photoreceptor 10 is cleaned therefrom.

The present electrostatographic components can be any suitable working component used in the electrostatographic processes, including electrophotographic, image on image, digital, contact electrostatic printing, and like electrostatographic processes. Examples of electrstatographic components include: a) fuser system members or fuser members, including donor rolls, belts, films, sheets, and the like; pressure rolls, belts, films, sheets, and the like; fuser rolls, belts, films, sheets and the like; and b) other xerographic system members including toner transfer members such as transfer rollers, belts, films, sheets and the like; photoreceptors or photoconductors, or other belts, rolls, films, sheets and like components which carry the latent image thereon; and biasable members such as bias transfer rolls, belts, films, sheets and the like.

Because of the unique differences in physical and performance characteristics of the many electrostatographic systems, it would be highly unusual to develop a surface which would provide superior results for the various and diverse electrostatographic system members. Such a surface would require mechanical, electrical and chemical characteristics to enable good release for fusing and toner transfer, good thermal conductivity for fusing, good electrical resistivity for charging members and transfer members, and good mechanical stability for long life components. In addition, a superior component coating would have good adhesive characteristics to decrease or eliminate the problem of delamination. In addition, an excellent feature of such a component coating would be a coating that had a decreased unit manufacturing cost. Surprisingly, the unique characteristics of the thin, perfluoropolymer coating of the present invention provides a surface which possesses superior results when used as a surface layer for various electrostatographic components.

Figure 2:
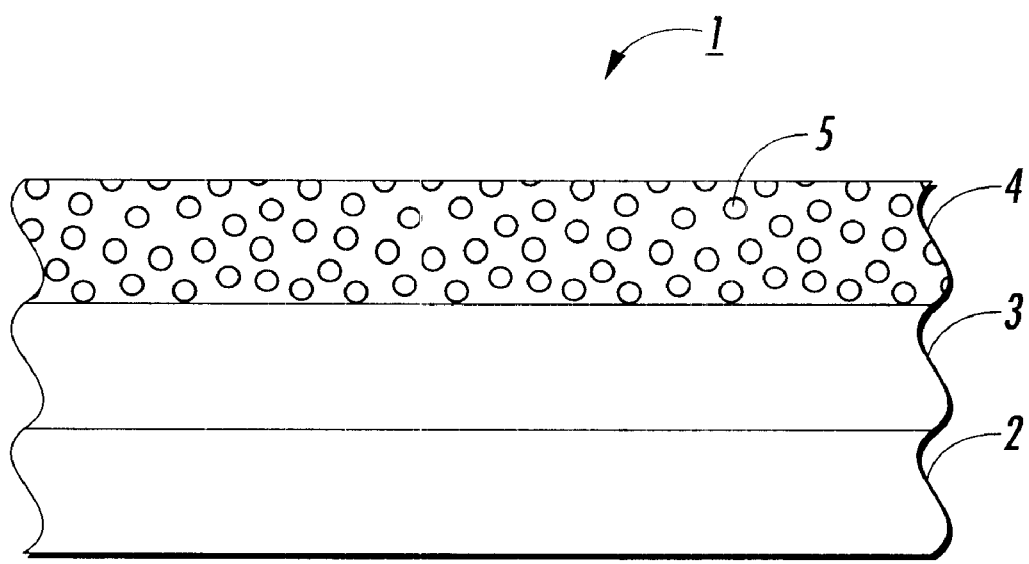
FIG. 2 is a sectional view of a component in accordance with one embodiment of the invention.

FIG. 2 represents an embodiment of the invention and includes electrostatographic component 1, having substrate 2 which may be a belt, film, sheet, roller, or like substrate member, and may comprise a plastic, metal, fabric or the like. In an embodiment, the substrate may be a cylindrical roller, comprising aluminum or stainless steel substrate. include polyamides and polyimides.

The substrate may comprise a polymer material such as a hard polymer of, for example, polyimide, polyamide, polyamideimide, polyphenylene sulfide, polysulfone, polyethylene terephthalate, polyvinylfluoride, polyvinylidene fluoride, and like hard polymer materials. Preferred polymers for the substrate Over the substrate 2 is an optional intermediate layer 3. Intermediate layer 3 may comprise any suitable polymer material. Preferably, the material can be selected from silicone rubbers, ethylene diene propene monomer rubber, fluoroelastomers, or any other high temperature conformable elastomer. A preferred fluoroelastomer are fluoroelastomers sold under the trademark VITON® from Dupont, and include copolymers and terpolymers of vinylidene fluoride, hexafluoropropylene and tetrafluoroethylene. A particularly preferred fluoroelastomer is a tetrapolymer of vinylidene fluoride, hexafluoropropylene, tetrafluoroethylene and a cure site monomer. Examples include VITON® GF, VITON® GH, VITON® E45 and VITON® B50. Preferably, the hardness of the hard polymer material is from about 100,000 to about 1,500,000 psi, and preferably from about 300,000 to about 750,000 psi. In a preferred embodiment, the intermediate layer is a relatively thin layer. Preferably, the thickness of the intermediate layer is from about 0.001 to about 0.25 inches, with a preferred range of from about 0.003 to about 0.1 inches.

In an optional embodiment, the intermediate layer and/or substrate comprises a porous material. This configuration allows for superior adhesion as compared to known configurations, since the oils are be absorbed into the porous layer. The absorption thereby reduces swelling of the layers, and in turn, decreases the occurrence of delamination. Porous materials such as paper are then incorporated with the perfluoroelastomer material and cured. This enables a porous network composite that has the perfluoroelastomer in the porous areas. This configuration enables absorption of various fluids such as hydrocarbon fluids and oils without affecting or degrading the composite network. The porous material conductivity is reduced outside the nip area but the pressure and nip dynamics enable the proper material properties in the nip area.

In another optional embodiment, the intermediate layer and/or substrate comprises a conformable foam material.

The thin, conformable perfluoroelastomer layer is then either incorporated into the foamed layer, or coated on the foamed intermediate layer and/or substrate. As with the porous intermediate configuration set forth immediately above, this foamed layer configuration would be highly suitable for a fuser component, wherein fuser oils are absorbed into the layers without affecting or degrading the polymer network. The porosity outside the nip area affects the composite confuctivity. However, once the material composite is in the nip area, the pressure and nip dynamics enable the correct composite properties. This configuration allows for superior adhesion as compared to known configurations, since the oils are absorbed into the foamed layer. However, the perfluoroelastomer in the composite pores prevents material degradation. The absorption thereby reduces swelling of the layers, and in turn, decreases the occurrence of delamination.

The outer layer coating 4 comprising a conformable perfluoroelastomer, is present on the optional intermediate layer 3 or, in an alternative embodiment, is present on the substrate 2. It is preferred that the perfluoroelastomer layer is relatively thin. Preferably, the outer perfluoroelastomer coating is coated to a thickness of from about 1 to about 75 micrometers, and preferably from about 5 to about 25 micrometers.

Perfluorocarbon compounds are fluorocarbon compounds in which the hydrogen directly attached to the carbon atoms is completely replaced by fluorine. Fluoroelastomers shall encompass the hydrogen-free perfluoroelastomers. Fluoroelastomer refers to a polymer with elastomeric behavior or a high degree of compliance, and containing one or more fluorinated monomers having ethylenic unsaturation, such as vinylidene fluoride, and one or more fluorinated comonomers containing ethylenic unsaturation, such as, for example, hexafluoropropylene, tetrafluoroethylene and the like. Perfluoroelastomers are materials often possessing very good temperature resistance and chemical resistance. Perfluoroelastomers are fluoroelastomers wherein the hydrogen directly attached to the carbon atoms is completely replaced by fluorine. The perfluoroelastomer may comprise a perfluorinated mono-olefin, a monoethylenically unsaturated hydrocarbon monomer completely substituted with fluorine atoms or completely substituted with a combination of fluorine atoms and chlorine atoms, for example hexafluoropropylene, tetrafluoroethylene, chlorotrifluoroethylene, and the like; vinyl ethers such as perfluoro vinyl ethers; and/or an optional cure site monomer or moiety. Examples of perfluoro vinyl ethers include perfluoro (methyl vinyl ether), (ethyl vinyl ether), (propyl vinyl ether) and like perfluoro vinyl ethers. Examples of perfluoroelastomers include tetrafluoroethylene/perfluoro(methyl vinyl ether) copolymer and hexafluoropropylene/perfluoro (methyl vinyl ether) copolymer. In preferred embodiments, the perfluoroelastomer can comprise a copolymer of tetrafluoroethylene, a perfluoro (alkyl vinyl ether), and/or a fluorine-containing ethylenically unsaturated monomer. In a preferred embodiment, the perfluoro (alkyl vinyl ether) is a perfluoroalkoxy vinyl ether, and in particular, perfluoro (3-phenoxypropylvinyl ether). In a particularly preferred embodiment, the perfluoroelastomer is a reaction product of perfluoro (3-phenoxypropylvinyl ether) and at least one fluorine-containing ethylenically unsaturated monomer. Commercial examples of perfluoropolymers include KALREZ® (from DuPont).

Preferably, the outer perfluoroelastomer coating is conformable, and has a hardness of from about 45 to about 95 Shore A, preferably from about 50 to about 70 Shore A.

In optional embodiments, the intermediate layer and/or the outer perfluoroelastomer-coating layer can include fillers 5. Such fillers can aid in tailoring the electrical and thermal properties of the outer coating, depending on what component the coating will be used. Examples of suitable fillers include metal oxides, graphite and carbon black. Specific examples of suitable fillers include metal oxides such as zinc oxide, aluminum oxide, antimony dioxide, copper oxide, zinc oxide, titanium dioxide, silicone dioxide, and the like; doped metal oxides such as aluminum doped zinc oxide, antimony doped titanium dioxide, antimony doped tin oxide, similar doped oxides, and mixtures thereof; carbon fillers such as carbon black, graphite, fluorinated carbon, and like carbon fillers; boron nitride; ionic salts; and conductive polymers such as polyanilines and thiophenes.

All the patents and applications referred to herein are hereby specifically, And totally incorporated herein by reference in their entirety in the instant Specification.

The following Examples further define and describe embodiments of the present invention. Unless otherwise indicated, all parts and percentages are by weight.

EXAMPLES

Example I

A perfluoroelastomer layer (for example, KALREZ® from DuPont Dow Elastomers) can be obtained and formed into a thin film using solvents known to be compatible with perfluoroelastomers. Other solvents may also work. The perfluoroelastomer layer can be formed into a thin film about 25 microns in thickness. The thin film can then be applied to a substrate, such as a porous fabric material, for example, a polyamide. Examples of polyamides include KEVLAR® which is an aromatic polyamide from DuPont. The thin film can be applied to the substrate by spray coating, liquid coating or like coating processes. The substrate having the thin perfluoroelastomer material can be used as a fuser member or transfer member.

Example II

Thin Perfluoroelastomer Outer Layer, Silicone Rubber Intermediate Layer Provided on a Polyamide Substrate A perfluoroelastomer layer (for example, KALREZ® from DuPont Dow Elastomers) can be obtained and formed into a thin film using solvents known to be compatible with perfluoroelastomers. Other solvents may also work.

The perfluoroelastomer layer can be formed into a thin film about 25 microns in thickness. A silicone rubber material can be purchased from General Electric or Dow Corning and formed into a layer via known liquid elastomer processing methods. The thin perfluoroelastomer layer can be coated onto the silicone rubber intermediate layer using spray coating, liquid coating techniques, or other like processes.

The thin perfluoroelastomer layer coated on the intermediate layer can then be applied to a substrate, such as a porous fabric material such as, for example, a polyamide (for example, KEVLAR® which is a aromatic polyamide from DuPont). The combined layers can be adhered to the substrate by lamination or adhesion techniques. The substrate having the intermediate layer and thin perfluoroelastomer outer layer can be used as a fuser member or transfer member.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An electrostatographic component comprising a substrate and an outer coating of a thin, conformable perfluoroelastomer, wherein the perfluoroelastomer is the reaction product of perfluoro (3-phenoxypropylvinyl ether) and at least one fluorine-containing ethylenically unsaturated monomer, wherein said outer coating has a thickness of from about 1 to about 75 micrometers and wherein said outer coating has a hardness from about 45 to about 95 Shore A.

2. An electrostatographic component in accordance with claim 1, wherein said thickness is from about 5 to about 25 micrometers.

3. An electrostatographic component in accordance with claim 1, wherein said outer coating has a hardness of from about 50 to about 70 Shore A.

4. An electrostatographic component in accordance with claim 1, wherein said substrate comprises a polymer selected from the group consisting of polyimides, polyamides, polyamideimide, polyphenylene sulfide, polysulfone, polyethylene terephthalate, polyvinylfluoride, and polyvinylidene fluoride.

5. An electrostatographic component in accordance with claim 1, wherein an intermediate layer is positioned between said substrate and said outer coating.

6. An electrostatographic component in accordance with claim 5, wherein said intermediate layer comprises a material selected from the group consisting of silicone rubbers, ethylene diene propene monomer rubbers, and fluoroelastomers.

7. An electrostatographic component in accordance with claim 5, wherein said intermediate layer comprises a porous material.

8. An electrostatographic component in accordance with claim 5, wherein said intermediate layer comprises a foamed material.

9. An electrostatographic component in accordance with claim 1, wherein said outer coating further comprises a filler.

10. An electrostatographic component in accordance with claim 9, wherein said filler is selected from the group consisting of metal oxides, doped metal oxides, graphite, carbon black, fluorinated carbon, boron nitride, ionic salts, and conductive polymers.

11. An electrostatographic component in accordance with claim 10, wherein said metal oxide is selected from the group consisting of zinc oxide, aluminum oxide, antimony dioxide, copper oxide, and titanium dioxide.

12. An electrostatographic component in accordance with claim 1, wherein said substrate is a cylindrical roller.

13. An electrostatographic component in accordance with claim 1, wherein said substrate is in the form of a belt.

14. An electrostatographic component in accordance with claim 1, wherein said electrostatographic component is a fuser member.

15. An electrostatographic component in accordance with claim 1, wherein said electrostatographic component is an intermediate transfer member.

16. An electrostatographic component in accordance with claim 1, wherein said electrostatographic component is a photoreceptor.

17. An electrostatographic component in accordance with claim 1, wherein said electrostatographic component is a biasable member.

18. An image forming apparatus for forming images on a recording medium comprising a processing station, wherein said processing station comprises a xerographic system member comprising a substrate and an outer coating of a thin, conformable perfluoroelastomer, wherein said outer coating has a thickness of from about 1 to about 75 micrometers, and wherein said perfluoroelastomer is the reaction product of perfluoro (3-phenoxypropylvinyl ether) and at least one fluorine containing ethylenically unsaturated monomer and wherein said outer coating has a hardness from about 45 to about 95 Shore A.

19. An image forming apparatus for forming images on a recording medium in accordance with claim 18, wherein said at least one fluorine containing ethylenically unsaturated monomer is selected from the group consisting of tetrafluoroethylene and hexafluoropropylene.

20. An image forming apparatus for forming images on a recording medium comprising a processing station, wherein said processing station comprises a xerographic system member comprising a) a substrate comprising a polymer selected from the group consisting of polyimides, polyamides, polyamideimide, polyphenylene sulfide, polysulfone, polyethylene terephthalate, polyvinylfluoride, and polyvinylidene fluoride, b) an intermediate layer positioned between said substrate and an outer coating, wherein the intermediate layer comprises a material selected from the group consisting of silicone rubbers, ethylene diene propene monomer rubbers, and fluoroelastomers, c) an outer coating of a thin conformable perfluoroelastomer, wherein the outer coating has a thickness of from about 1 to about 75 micrometers, and a hardness from about 45 to about 95 Shore A, and wherein said perfluoroelastomer is the reaction product of perfluoro (3-phenoxpropylvinyl ether) and at least one fluorine-containing ethylenically unsaturated monomer.

* * * * *